July 10, 1962 O. J. ATCHLEY 3,043,265
PEN FOR FEEDING CALVES LIQUID AND SOLID FEED
Filed Feb. 6, 1959 4 Sheets-Sheet 1
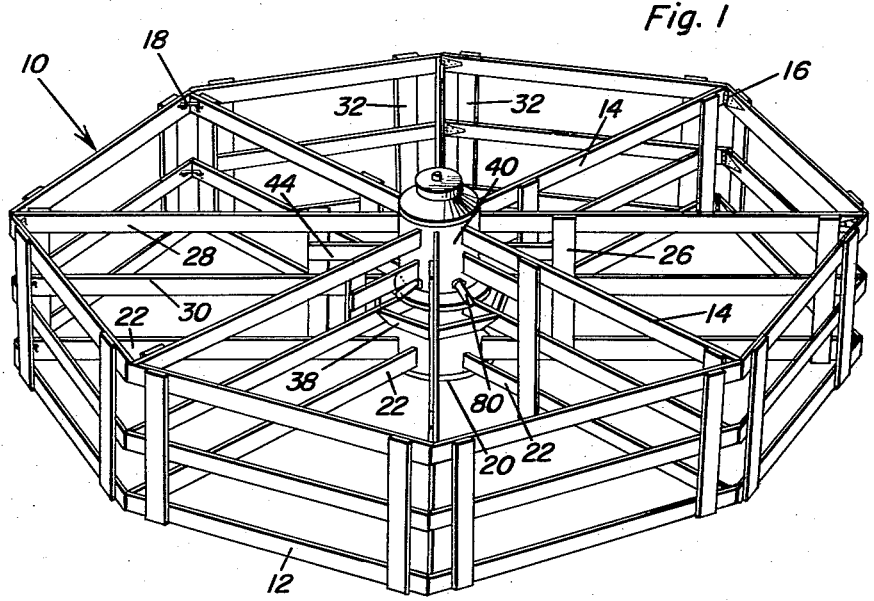
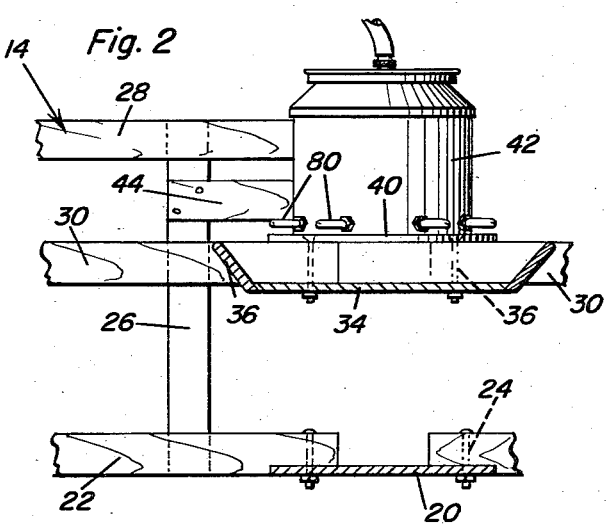
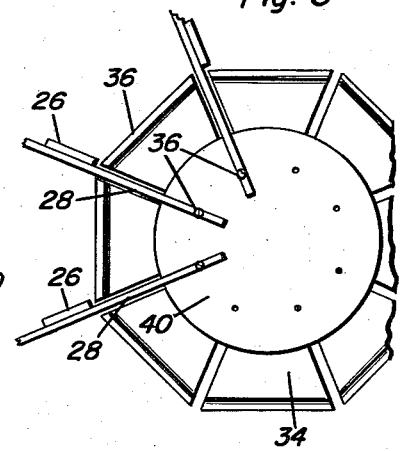
Oscar J. Atchley
INVENTOR.

Oscar J. Atchley
INVENTOR.

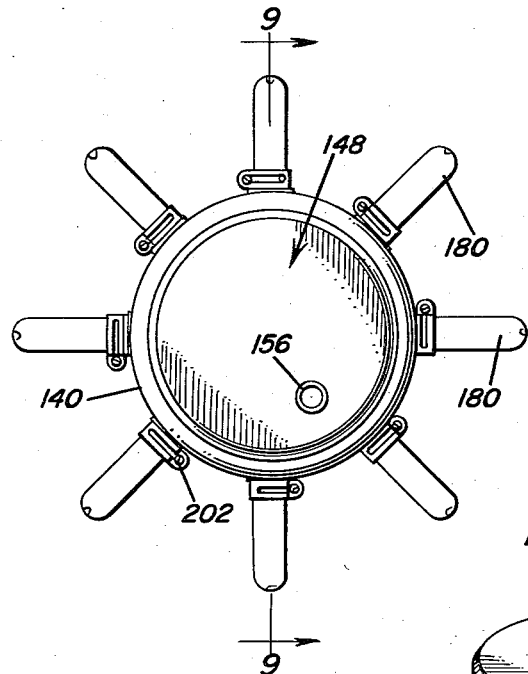
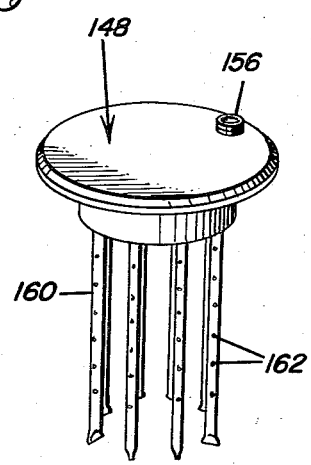
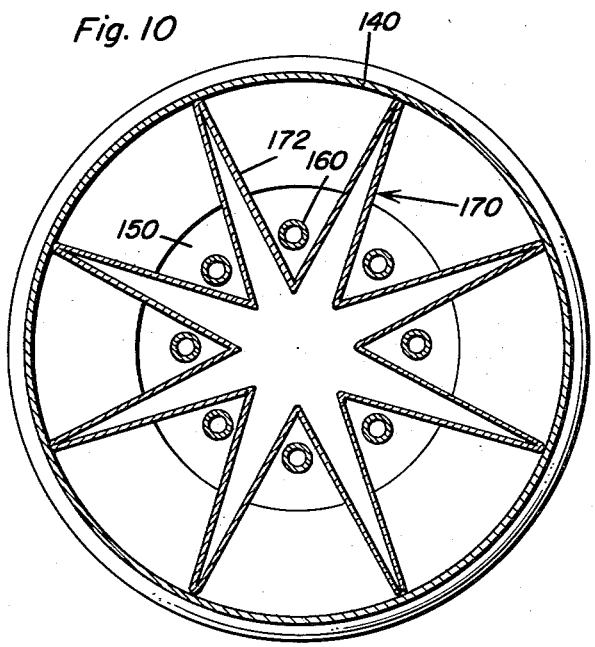

July 10, 1962 O. J. ATCHLEY 3,043,265
PEN FOR FEEDING CALVES LIQUID AND SOLID FEED
Filed Feb. 6, 1959 4 Sheets-Sheet 4
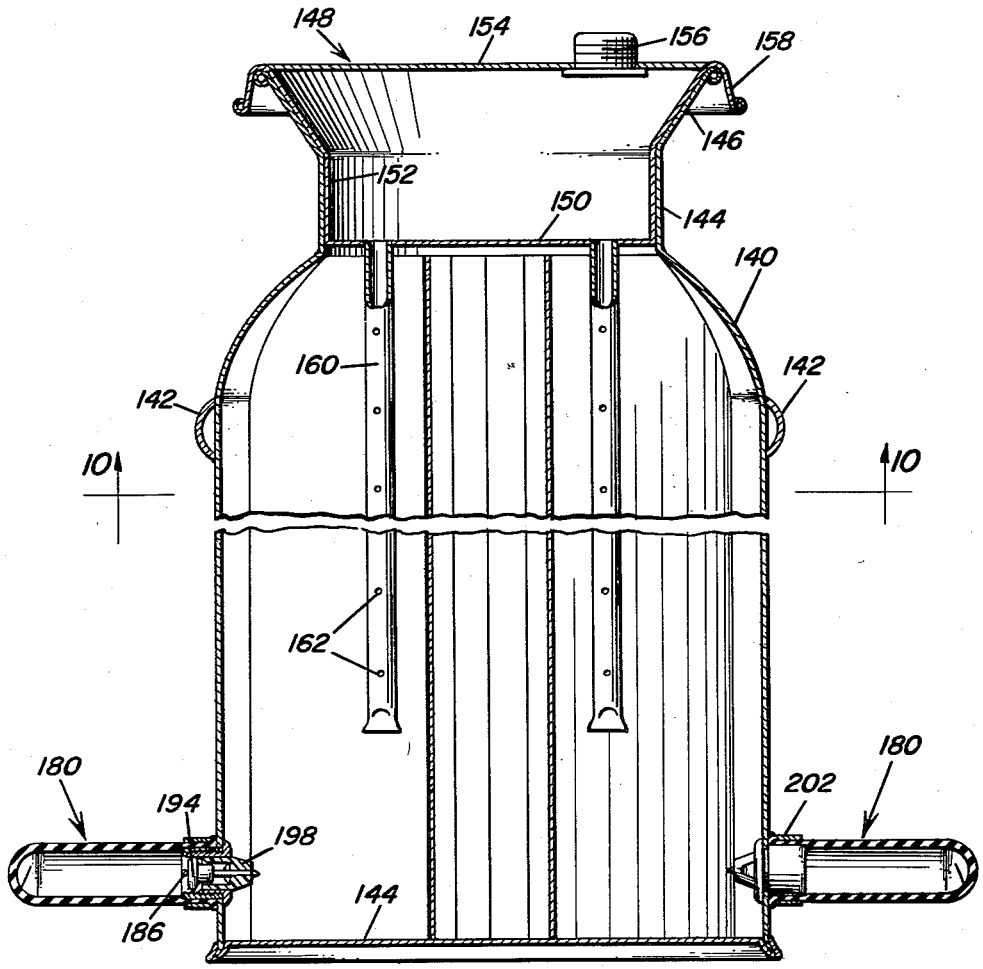
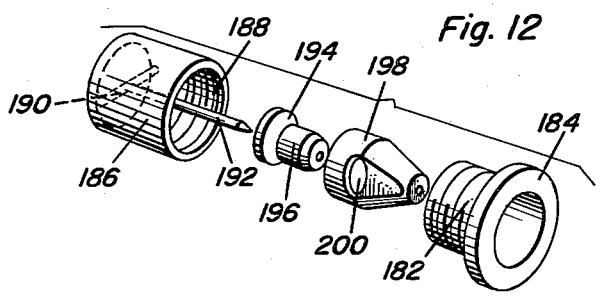
Oscar J. Atchley
INVENTOR.

3,043,265
PEN FOR FEEDING CALVES LIQUID AND SOLID FEED
Oscar J. Atchley, El Dorado Springs, Mo.
(835 Broad St., Batesville, Ark.)
Filed Feb. 6, 1959, Ser. No. 791,560
6 Claims. (Cl. 119—20)

This invention comprises a novel and useful pen for feeding calves liquid and solid feed and more particularly relates to a device for use in feeding calves and other young stock either liquid or solid feed and which will facilitate the transition from feeding liquid feed to feeding solid feed.

This application contains subject matter which is common to that of my prior copending application Serial No. 689,216, now matured into Patent No. 2,905,143, for Calf Feeder, filed October 9, 1957, and includes further improvements thereover.

The principal object of this invention is to provide an apparatus which will enable the stock raiser to start young stock upon liquid feed; facilitate the changing of the stock to solid feed, and will continue the feeding of the stock with solid feed as long as may be desired.

A further object of the invention is to provide a feeding device in accordance with the foregoing object which shall be compact in its construction enabling a plurality of stock to be simultaneously fed either solid or liquid feed individually as required from a centrally disposed feeding station.

Another object of the invention is to provide a device in accordance with the foregoing objects wherein a generally circular pen is provided having radial partitions dividing the same into separate stalls, with a centrally located feeding station containing both liquid and solid feed dispensers whereby the animal in each stall may have convenient access to the feed which he is intended to receive.

A further object of the invention is to provide an apparatus in accordance with the foregoing objects wherein an improved construction of the pen is provided for rigidly connecting together the partition walls of the individual stalls with the central feeding station.

Still another object of the invention is to provide in a feeder for calves and other stock a means for feeding liquid feed in an improved manner to the individual animal whereby each may receive a proper amount of feed.

Yet another object of the invention is to provide a liquid feeder for stock together with a construction and means for effectively cleansing the interior of the liquid feeder in an improved manner and in order to maintain a hygienic and sanitary condition therein.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view showing an apparatus for feeding stock incorporating therein the principles of this invention;

FIGURE 2 is a detail view showing in vertical section the liquid and solid feeder of the invention and a portion of the associated structure of the apparatus;

FIGURE 3 is a detail view, parts being broken away and omitted, and showing a further portion of the apparatus;

FIGURE 8 is a top plan view of a modified construction of the liquid feeder of the invention;

FIGURE 9 is a vertical longitudinal sectional view taken upon an enlarged scale substantially upon the plane indicated by the section line 9—9 of FIGURE 8 parts being broken away;

FIGURE 10 is a horizontal sectional view taken substantially upon the plane indicated by the section line 10—10 of FIGURE 9 and showing certain internal details of the same;

FIGURE 11 is a perspective view of the cleaning element for the feeder of FIGURE 9; and FIGURE 12 is an exploded perspective view of a valve assembly of the invention for use in a feeding nipple.

Figure 4:
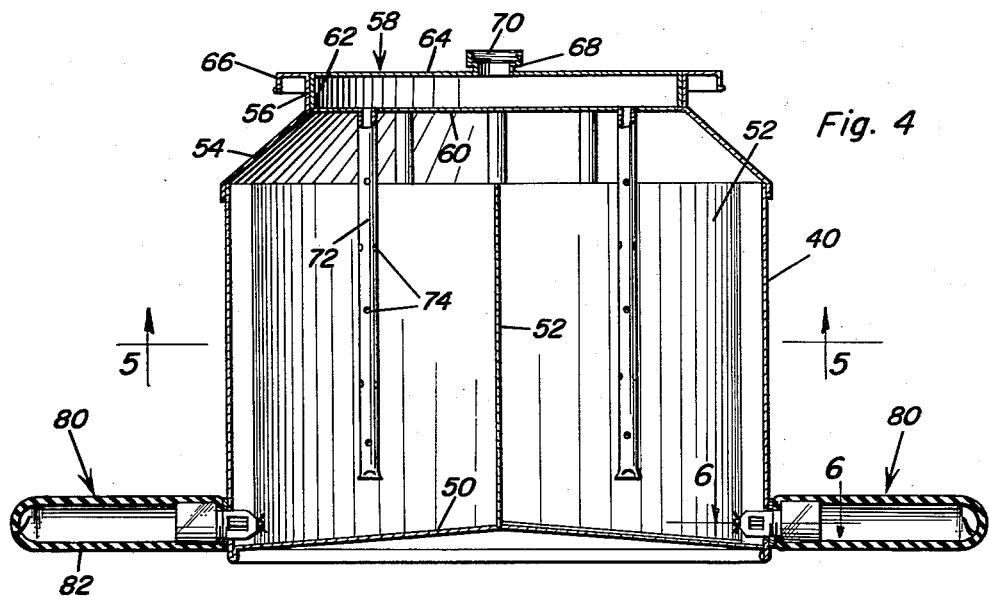
FIGURE 4 is a view in vertical central section through the liquid feeder in accordance with the invention.

In the accompanying drawings, reference is made first to FIGURE 1 wherein it will be seen that the feeding apparatus in accordance with this invention designated by the numeral 10 comprises a generally circular pen whose periphery comprises a plurality of separately removable panels 12, suitably connected to each other and to radially extending partition panels 14 which divide the area within the peripheral or wall panels 12 into a plurality of triangularly shaped stalls. Each of these stalls is of sufficient size to accommodate a calf or other young stock and the wall panels 12 may be selectively removed or closed in order to permit entrance of the stock into the stall and to confine the same therein during the feeding operation or for other purposes.

As will be apparent in FIGURE 1, each of the wall panels 12 may be hinged as at 16 to one of the partition panels, and may likewise be provided with fasteners or hooks 18 by which its other end may be secured to an adjacent partition panel.

Considering more closely and in greater detail the construction of the pen 10, reference is also made to FIGURES 2 and 3. From these figures it will be observed that at the center of the pen there is provided a circular plate 20 to which are secured the radially inward ends of the bottom rails 22 of each of the partitions 14, suitable detachable fasteners such as bolts 24 or the like being provided for this purpose. The plate 20 thus serves to connect together the inward ends of the bottom rails of each of the partition panels or sections. In some instances, the plate 20 and the bolts 24 may be omitted, if desired.

Adjacent the radially inward end of each of the partitions 14 is provided a vertical member or batten 26 which is suitably rigidly secured at its lower end to the bottom rail 22, as well as to the top rail 28 and an intermediate rail 30 which make up these partitions. At their outer ends, adjacent their connection to the wall panels 12, these partitions are provided with a further vertically extending member or batten 32.

As shown in FIGURE 1, each of the wall panels 12 may conveniently be of similar construction, having top, bottom and middle rails secured in fixed relation to each other by vertically extending battens, and which rails may engage with the corresponding outer ends of the rails of the partitions.

Referring now to FIGURE 2 in connection with FIGURE 1 it will be observed that each of the inner ends of the intermediate rails 30 of the partitions rests upon a flat plate or shelf-like member 34, being detachably secured thereto as by the fastening bolts 36 in a removable manner. It will be observed that the member 34 extends into the triangular shaped stalls, and within each stall, is provided with an upwardly and outwardly inclined rim 38 whose opposite ends abut against and is secured to the adjacent intermediate rails 30 of the adjacent pair of partitions. Thus, each of the rims 38 in combination with the inner ends of the intermediate rails 30 and with that portion of the plate 34 lying between the two bounding partitions constitutes a tray for receiving solid feed with which the animal confined in the pen is to be supplied. It will thus be noted that the trays or troughs for feeding solid feed are disposed at the central portion of the pen wherein they may all be conveniently supplied and replenished with feed as desired.

From a comparison of FIGURES 2 and 3 it will be seen that the adjacent inward end of the intermediate rails 30 are spaced from each other and a disk or plate 40 overlies the same and rests upon these inner ends, being secured thereto by the above mentioned fastening bolts 36. This plate 40 constitutes a support or base upon which the liquid feeder 42 is adapted to rest and be supported.

The radially inner ends of the upper rails 28 terminate in spaced relation to each other and loosely abut against and receive therebetween the side wall of the liquid feed container 42. Additional brace members 44 are secured to the battens 26 of the radial partitions and likewise serve to brace and position the liquid feeder 42 at the central portion of the end and above the solid feed station previously mentioned.

As so far described it will now be apparent that either liquid or solid feed is dispensed to the stock from a central feeding station within the pen; and the feed may be replenished or renewed in one operation to thus service all of the stalls of the pen.

Reference is now made to FIGURES 4–7 for a description of the liquid feeder 40 which is removably placed at the feeding station of the pen. Preferably the feeder 40 consists of a cylindrical container having a raised bottom wall 50 which is inclined from its periphery upwardly towards its center, whereby a liquid therein will drain to and tend to collect at the peripheral juncture of the bottom wall with the side wall of the container.

Figure 5:
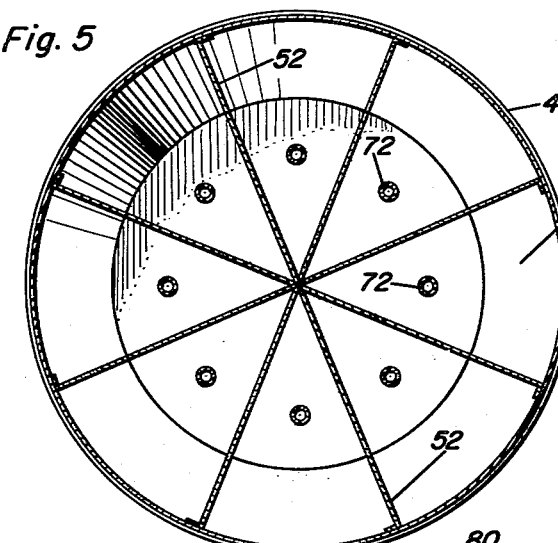
FIGURE 5 is a horizontal sectional view taken substantially upon the plane indicated by the section line 5—5 of FIGURE 4.

The interior of the container is divided into segments by a plurality of radial partitions 52 which as shown best in FIGURE 5 join the cylindrical periphery and each other at the center of the container to divide the latter into a plurality of compartments, which are substantially triangular in cross-section, there being provided one such compartment for each of the stalls of the pen.

The upper end of the container has an upwardly convergent conical shoulder 54 terminating in a cylindrical neck portion 56.

A combined closure for this neck and a cleaning means is provided for the container. This consists of the closure for the open neck portion 56 of the container and consists of a hollow drum shaped member 58 having a flat circular bottom wall 60 together with a cylindrical upstanding rim 62 which are slidably received within the neck 56. At the upper end of the rim 62 there is provided a flat top wall 64 secured to the rim and extending radially beyond the latter and terminating in an annular downturned flange 66. The rim 62 together with the top and bottom member, 64 and 60, define a cylindrical or drum-shaped chamber therebetween from which rises an internally threaded spout or filler neck 68 having internal screw threads 70 therein. These threads may be engaged by a closure plug or may receive the threaded nozzle of a hose or the like whereby a cleaning fluid such as water or steam may be supplied into the interior of the drum-like body 58 for a purpose to be subsequently apparent.

Depending from the bottom wall 60 is a plurality of conduits 72 each of which has a plurality of perforations 74 therein. These conduits extend each substantially centrally of one of the compartments formed in the container by the previously mentioned partitions 52 and substantially centrally thereof, and closely adjacent to the bottom wall 50. The arrangement is such that when a cleaning fluid of any suitable type is supplied through the neck 68 into the hollow drum 58, it will be discharged by means of the conduit 72 and the orifices or nozzles 74 to the interior of the compartments of the container 40 and thus will cleanse and sterilize the same.

It will be observed that the body 58 with its conduits is thus removable from the neck of the container when it is desired to fill the same with milk or other liquid feed for the stock.

Secured in the lower end portion of the side wall of the container 40 just above the junction of the bottom wall 50 therewith are a plurality of feeding nipples each designated generally by the numeral 80. As will be noted especially from FIGURE 1, these nozzles are so disposed that there is provided one such nozzle for each of the stalls.

Figure 7:
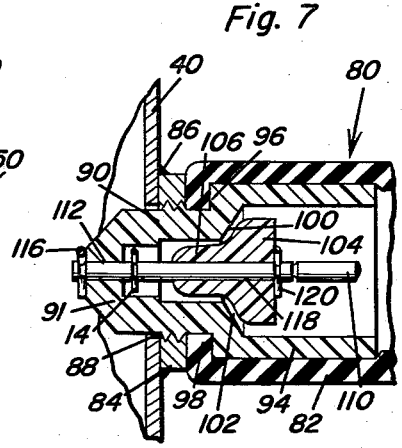
FIGURE 7 is a further detail view taken upon an enlarged scale substantially upon the plane indicated by the section line 7—7 of FIGURE 6.
Figure 6:
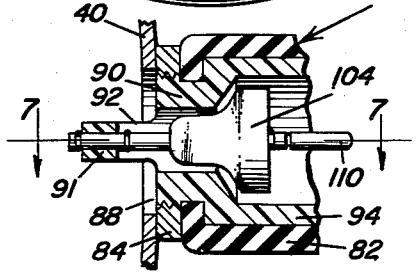
FIGURE 6 is a detail view taken upon an enlarged scale substantially upon the plane indicated by the section line 6—6 of FIGURE 4 and showing certain structural details of the control valve of the feeding nipples of the feeder.

Referring now particularly to FIGURES 6 and 7 it will be seen that each of the nipples 80 consist of a rubber sleeve 82 forming a conventional feeding nipple and which is connected to a valved outlet.

Thus there is provided a nut 84 which is welded as at 86 to the exterior surface of the container 40 or secured thereto fixedly in any other desired manner, with this nut registering with an aperture 88 through the wall of the container. An externally threaded bushing or sleeve 90 is engaged through this nut with its cone shaped extremity extending into the interior of the container. As will be noted by a comparison of FIGURES 6 and 7, the extremity 90 is cut-away on diametrically opposite sides to provide slots or openings as at 92 opening into the hollow interior of the bushing 90. At its outer end, the bushing is provided with a diametrically enlarged portion or sleeve 94 having an annular shoulder 96 by which this sleeve is joined to the bushing 90. The previously mentioned nipple 82 is provided with an inturned annular flange as at 98 which is adapted to rest upon the shoulder 96 and to be confined between the latter and the nut 84 when the body 90 is screw threadedly engaged in the nut 84. Thus the nipple is clamped to the bushing 90 in a fluid-tight manner.

Upon the interior surface of the bushing 90 at its junction with its sleeve 94 there is provided a conical surface 100 comprising a valve seat which is engaged by the correspondingly shaped surface 102 of a valve body 104 which has a valve stem 106 of diametrically reduced configuration and adapted for sliding movement within the central bore of the body 90.

A guide spindle 110 has one end received in the bore 112 formed in the conical portion 91 of the body 90, being removably retained therein as by snap rings 114 and 116 detachably secured in annular grooves on the spindle 110 on opposite sides of the portion 91. The valve body 104 and its stem 106 has a bore 118 by which it is slidably mounted upon the spindle 110, being retained upon this spindle as by a snap ring 120.

The arrangement is such that the valve possesses a limited sliding movement upon the spindle.

The function of the valve is to limit the rate of flow of liquid from the compartment within the container into the nipple 80 in response to sucking upon the nipple by the stock. When the nipple is filled with liquid, the valve will close against its seat 100 preventing the escape or waste or liquid, while the valve will be opened by the suction imparted thereto by the stock chewing upon the nipple. If desired any suitable means may be provided for resiliently urging the valve to its seat as desired.

Reference is now made to a somewhat modified construction of liquid container shown in FIGURES 8–12 and which is disclosed and claimed in my above identified copending application. Briefly, this form of container indicated generally by the numeral 140 is likewise cylindrical, having handles 142 on the side thereof to facilitate handling of the same and being provided with a bottom wall 144 which is illustrated as being flat but may be sloped radially outwardly towards its rim in the same manner as the container 40 previously described. The container 140 is provided with a cylindrical neck portion 144 with a conical outwardly divergent upper surface 146. This opening in the container is closed by a closure body designated generally by the numeral 148 and which is drum shaped and hollow, including a flat bottom wall 150 with a side wall 152 similar in shape to the stem and its portion 144, 146 of the container. The side wall is engaged by a top wall 154 to thus provide a hollow chamber therebetween with which an externally threaded nozzle or fitting 156 communicates. A downturned flange 158 is provided at the upper edge of the closure body 148 to facilitate handling of the same.

The bottom wall 150 has a plurality of downwardly projecting pipes or conduits 160 having suitable orifices, nozzles or apertures as at 162, there being provided one such pipe for each of the compartments formed within the container.

Referring now especially to FIGURE 10 it will be observed that there is provided a means removably received within the interior of the container by which the latter is divided into a plurality of compartments. This means indicated generally by the numeral 170 is star shaped in configuration comprising a plurality of wedge shaped radial webs or partitions 172 which are integrally connected with each other as shown in FIGURE 10. The engagement of the outer edges of these webs with the interior of the container divides the latter into a plurality of circumferentially spaced compartments, each of which is substantially wedge shaped in configuration. As above mentioned, one of the pipes or conduits 160 is disposed in each such compartment.

Although as mentioned above, the divider 170 can be removed from the container, it is preferred to rigidly and permanently secure the same in place with the outer edges of the separators 172 welded or otherwise fixedly secured to the wall of the container.

Adjacent the bottom wall 144 of the container there are provided, as in the preceding embodiment, a plurality of nipples each designated generally by the numeral 180. The nipple is secured by a valve fitting into the wall of the container just above the bottom wall 144 thereof. The valve attaching means, whose components are shown best in FIGURE 12, consists of an externally threaded bushing 182 having an annular rim 184. This bushing is received on the interior of the can with the threaded portion projecting outwardly through the corresponding opening of the container, and with the flange 184 serving as a securing means which engages the inside surface of the container. A sleeve 186 is internally threaded as at 188 for reception upon the outwardly projecting portion of the bushing 182, and abuts against the outside surface of the wall of the container 140 to thus assist in clamping the bushing to the container. A diametrically disposed bar 190 is secured across the outer end of the sleeve 186, and carries a centrally disposed spindle 192 extending axially through the sleeve and bushing and into the interior of the container. Slidably received upon the spindle 192 is a valve body 194, having a stem 196. The valve body cooperates with a valve seat bushing 198 which likewise embraces the spindle and which has its exterior surface frictionally engaged within the bushing 182. Suitable ports 200 are provided in the bushing 198 so that fluid may pass from the same to the interior of the can and into the nipple. It will be understood that cooperating seats are provided on the adjacent surfaces of the valve body 194 and of the valve seat bushing 198, and that the valve body is free to reciprocate between its seat upon the bushing and against the cross bar 190 which constitutes a stop means for the valve. The nipple 180 embraces the sleeve 186 and is secured thereto as by a clamp 202 or in any other desired manner.

The operation of this form of the invention is identical with that previously described, except for the difference in structure of the valved connection by which the nipple is secured to and communicates with the interior of the container and the structure of the separator means by which the interior of the container 140 is divided into a plurality of circumferentially spaced compartments. As in the preceding embodiment, a cleaning fluid of any desired character may be supplied through the threaded fitting 156 into the interior of the body 148 from thence to the pipes 160 and the orifices or nozzles 162 may be thoroughly sprayed into the interior of the container for cleansing each compartment of the same.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A solid and liquid pen type feeding device for stock comprising a generally circular open pen consisting of a peripheral wall composed of a plurality of separably removable hingedly connected sections and a plurality of radially positioned partitions in said pen each engaging said peripheral wall and dividing said pen into a plurality of stalls meeting at the center of the pen, means attaching the outer ends of each partition to said wall at the junction of a pair of adjacent wall sections, means at the center of the pen for securing the inner ends of said partitions, liquid and solid feed supply means at the center of said pen available to each of said stalls, at least several of said partitions having each a horizontally radially extending rail disposed vertically above the lower end of its associated partition, said supply means being carried and supported by said last named rails, each section of said wall having at one end thereof a detachable connection with the adjacent end of a wall section and a partition whereby each wall section comprises an access gate for one of said stalls.

2. The combination of claim 1 wherein said partitions each include a horizontal bottom rail, further securing means comprising an upper member, said bottom rails having their radially inner ends rigidly secured to said lower member.

3. The combination of claim 1 wherein said securing means comprises a flat member, an upstanding rim on said flat member having portions extending across and closing the space between adjacent intermediate rails and defining a solid feed container.

4. The combination of claim 3 including a support plate resting upon the upper surfaces of said radially inner ends of said rails and comprising a support for a liquid feed container.

5. The combination of claim 4 including additional elements carried by said partitions and extending toward the center of said pen and engaging and positioning said liquid feed container.

6. The combination of claim 1 wherein each wall section is hingedly connected to a partition at one end of each.

References Cited in the file of this patent

UNITED STATES PATENTS

| | | |
|---|---|---|
| 1,744,692 | Wessel | Jan. 21, 1930 |
| 2,711,715 | Thale | June 28, 1955 |
| 2,717,000 | Wilson et al. | Sept. 6, 1955 |
| 2,861,545 | Schoeffel | Nov. 25, 1958 |
| 2,863,419 | Murrel | Dec. 9, 1958 |
| 2,905,143 | Atchley | Sept. 22, 1959 |